J. A. BODKIN.
GUARD RAIL CLAMP.
APPLICATION FILED MAY 22, 1915.
1,220,392.
Patented Mar. 27, 1917.
3 SHEETS—SHEET 1.
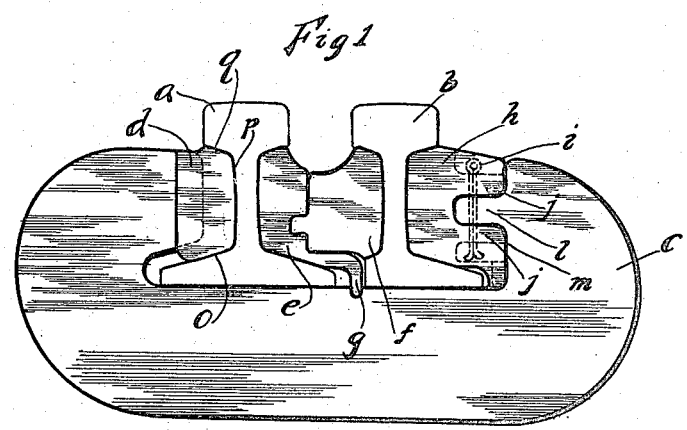
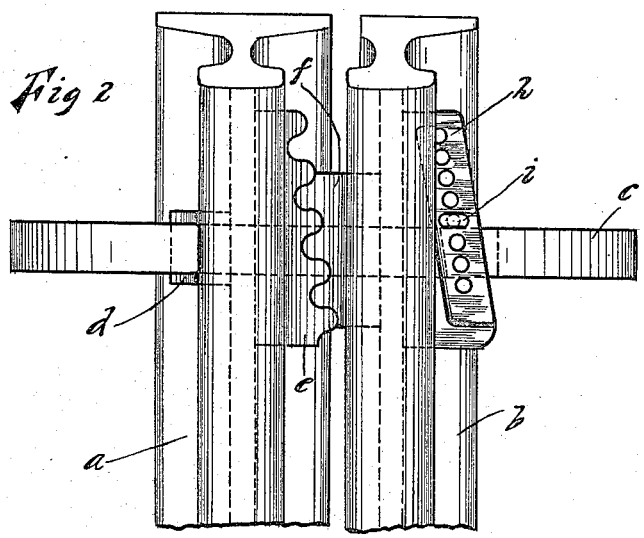
WITNESSES
William J. Brown
Philip A. Bodkin
INVENTOR
JOHN A. BODKIN
BY
Conrad A. Dieterich
ATTORNEY J. A. BODKIN.
GUARD RAIL CLAMP.
APPLICATION FILED MAY 22, 1915.
1,220,392.
Patented Mar. 27, 1917.
3 SHEETS—SHEET 2.
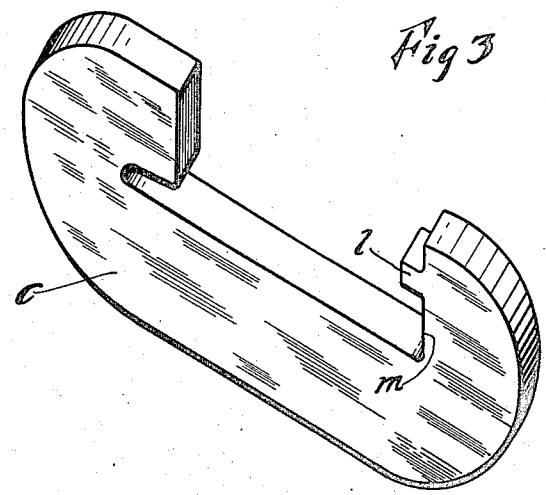
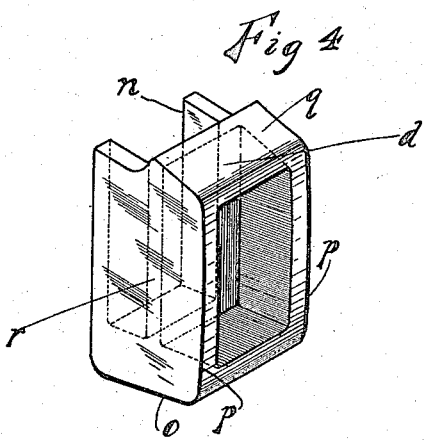
WITNESSES
William J. Brown
Philip A. Bodkin
INVENTOR
JOHN A BODKIN
BY
Conrad A. Dieterich
his ATTORNEY J. A. BODKIN.
GUARD RAIL CLAMP.
APPLICATION FILED MAY 22, 1915.
1,220,392.
Patented Mar. 27, 1917.
3 SHEETS—SHEET 3.
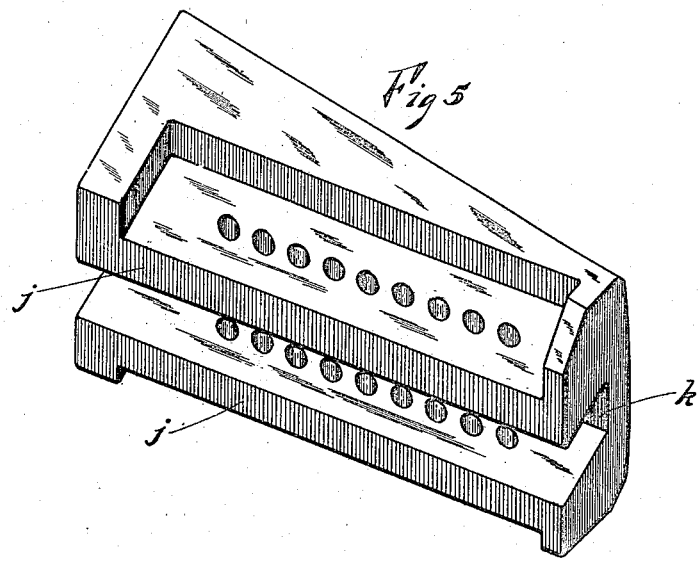
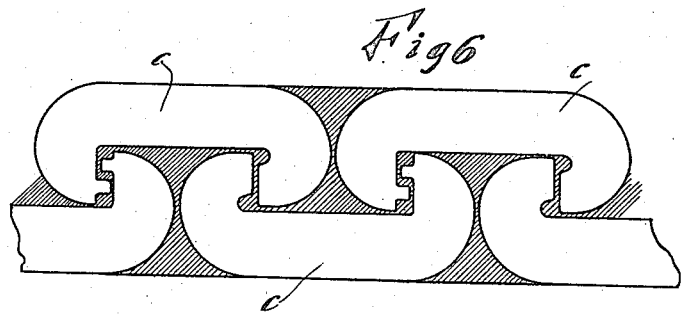
WITNESSES
William J Brown
Philip A Bodkin
INVENTOR
JOHN A BODKIN
BY
Conrad A Dieterich
his ATTORNEY

UNITED STATES PATENT OFFICE.

JOHN A. BODKIN, OF NEW YORK, N. Y.

GUARD-RAIL CLAMP.

1,220,392.  Specification of Letters Patent.  Patented Mar. 27, 1917.

Application filed May 22, 1915. Serial No. 29,817.

*To all whom it may concern:*

Be it known that I, JOHN A. BODKIN, a citizen of the United States, and a resident of New York, in the county of New York and State of New York, have invented certain new and useful Improvements in Guard-Rail Clamps; and I do hereby declare that the following is a full, clear, and exact description thereof.

This invention relates to an improvement in guard rail clamps, the object being to simplify the manufacturing process, at the same time producing a device that shall consist of but few simple parts that can readily be adjusted without disturbing the guard rail, and which will always remain in a position requisite to resist all the usual forces to which devices of this nature are subjected when in service.

A further object of the invention is to construct a clamp that shall be heavy and durable and shall fit snugly around rails of all sizes.

A further object is to provide a device of this character in which the yoke is formed of tougher material than the wedge which is positioned between the yoke and one of the rails and in which the yoke is provided with a tongue adapted to engage a groove in the wedge.

In the accompanying drawings there is shown an illustrative embodiment of the invention.

In the drawings, Figure 1 is a side elevation, showing the clamp assembled on the rails.

Fig. 2 is a plan view of Fig. 1.

Fig. 3 is a detail view showing the clamp yoke in perspective.

Fig. 4 is a perspective view of the fitting brace, showing the hollow construction and ribbed walls.

Fig. 5 is a perspective view of the wedge.

Fig. 6 shows an economical method of cutting yokes from steel sheets.

Referring to the drawings $a$ and $b$ represent the rails to which, after they are spiked in place, the guard rail clamp is applied.

The yoke $c$ of the clamp is provided with upwardly extending end portions one of which extends inwardly and the other of which is provided with a tongue $l$ for a purpose hereinafter described. The yoke, which is forged, is preferably made by stamping or punching the same from a sheet of steel as indicated in Fig. 6.

$d$ represents a fitting brace, preferably made as a casting having outwardly extending, spaced jaws $n$ forming a vertical pocket to receive the inwardly extending end of the yoke $c$. The upper and lower surfaces $q$ and $o$ are shaped to conform with the under surface of the rail head and the upper surface of the rail flange respectively as clearly shown in Fig. 1, while the inner surfaces of the side walls $p$ engage the web of the rail. The brace is provided with a transverse wall $r$ to support the yoke $c$ and also to strengthen the brace.

$h$ represents a wedge shaped to conform to the rail, as shown in Fig. 1, and having outwardly extending parallel flanges $j$ spaced from one another to form a groove $k$ adapted to receive the tongue $l$ on the yoke $c$. The flanges $j$ are provided with a series of sets of registering holes to receive a cotter pin $i$.

$e$ and $f$ represent filler blocks of standard design, the block $e$ being provided with lugs $g$ adapted to straddle the yoke $c$ in order to retain the blocks in position.

The guard rail clamp is applied in the following manner:

The yoke $c$ is first placed in position beneath the rails $a$ and $b$ and then the fitting brace $d$ is placed in the fishing space of one of the rails, as $a$, after which the inwardly extending end of the yoke $c$ is inserted within the pocket formed by the jaws $n$. The filler blocks $e$ and $f$ are next placed between the rails $a$ and $b$ in the usual manner. The wedge $h$ is then driven into position between the other end of the yoke $c$ and the second rail $b$ with the tongue $l$ of the yoke $c$ engaging the groove $k$ in the wedge. After the wedge is properly positioned the cotter pin $i$ is inserted through one of the series of sets of holes formed in the flanges $j$ of the wedge in order to hold the same securely in position.

By forming the tongue on the yoke instead of on the wedge there is less liability of the tongue breaking or being fractured as the yoke is made of a material which is considerably tougher and stronger than the cast metal of which the wedge is made. This is an important feature as it renders the clamp stronger and more durable than clamps in which the parts are formed of cast metal.

As the fitting brace and wedge may be made in various sizes to fit the fishing space of different sized rails it is possible to use one size of yoke for all sizes of rails, which is an advantageous feature.

I claim—

1. A guard rail clamp comprising a yoke having upwardly extending ends, one of said ends being provided with a tongue of reduced cross-section extending inwardly therefrom, co-acting filler blocks for spacing the rails, a wedge provided with a groove to receive the tongue on said one end of the yoke, and a fitting brace engaging the other end of said yoke, said yoke being formed of tougher material than said wedge and said fitting brace, substantially as specified.

2. A guard rail clamp comprising a forged yoke having upwardly extending ends, one of said ends being provided with a tongue of reduced cross-section extending inwardly therefrom, co-acting filler blocks for spacing the rails, a cast wedge provided with a groove to receive the tongue on said one end of the yoke, and a cast fitting brace engaging the other end of said yoke, substantially as specified.

3. A guard rail clamp comprising a yoke having upwardly extending ends, one of said ends having a bearing face and being provided with a tongue projecting inwardly from said bearing face, co-acting filler blocks for spacing the rails, a wedge engaging said bearing face and provided with a groove to receive said tongue, and a fitting brace engaging the other end of said yoke, substantially as specified.

4. A guard rail clamp comprising a yoke having upwardly extending ends, one of said ends having a bearing face and being provided with a tongue projecting inwardly from said bearing face, co-acting filler blocks for spacing the rails, a wedge engaging said bearing face and provided with a groove to receive said tongue, and a fitting brace engaging the other end of said yoke, said yoke being formed of tougher material than said wedge, substantially as specified.

5. A guard rail clamp comprising a yoke having upwardly extending ends, one of said ends having a bearing face and being provided with a tongue extending inwardly therefrom, co-acting filler blocks for spacing the rails, a wedge provided with outwardly-extending, spaced flanges engaging said bearing face, said flanges receiving between them said inwardly extending tongue, and a fitting brace engaging the other end of said yoke, substantially as specified.

In testimony, that I, claim the foregoing as my invention I affix my signature in the presence of two witnesses, this 5th day of April A. D. 1915.

JOHN A. BODKIN.

Witnesses:
M. A. BODKIN,
WILLIAM J. BROWN.